United States Patent [19]

Hollingsworth

[11] 4,233,711
[45] Nov. 18, 1980

[54] METALLIC CARD CLOTHING

[76] Inventor: John D. Hollingsworth, P.O. Box 516, Greenville, S.C. 29602

[21] Appl. No.: 940,004

[22] Filed: Sep. 6, 1978

[51] Int. Cl.³ .............................................. D01G 15/88
[52] U.S. Cl. ......................................................... 19/114
[58] Field of Search .......................................... 19/114

[56] References Cited

U.S. PATENT DOCUMENTS 2,937,413   5/1960   Hollingsworth ........................ 19/114

FOREIGN PATENT DOCUMENTS 3916207 10/1964 Japan .......................................... 19/114
1134 of 1878 United Kingdom ........................ 19/114
974186 11/1964 United Kingdom ........................ 19/114

Primary Examiner—Louis Rimrodt
Attorney, Agent, or Firm—Bailey, Dority & Flint

[57] ABSTRACT

Metallic wire card clothing is provided having a sharpened leading edge on each of the longitudinally aligned teeth formed in a metallic strip by an apparatus which includes a punch. During punching, the relative direction of travel of the punch is illustrated as inclined at an acute angle in relation to the moving strip and a die cooperating therewith. The method contemplates thus inclining the strip and while the strip is so inclined, punching the teeth as the strip is continuously fed past the die. The strip may be inclined in respect to the direction of travel of the punch either transversely or longitudinally, preferably, both.

4 Claims, 7 Drawing Figures

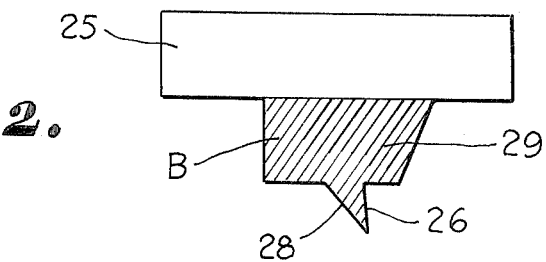
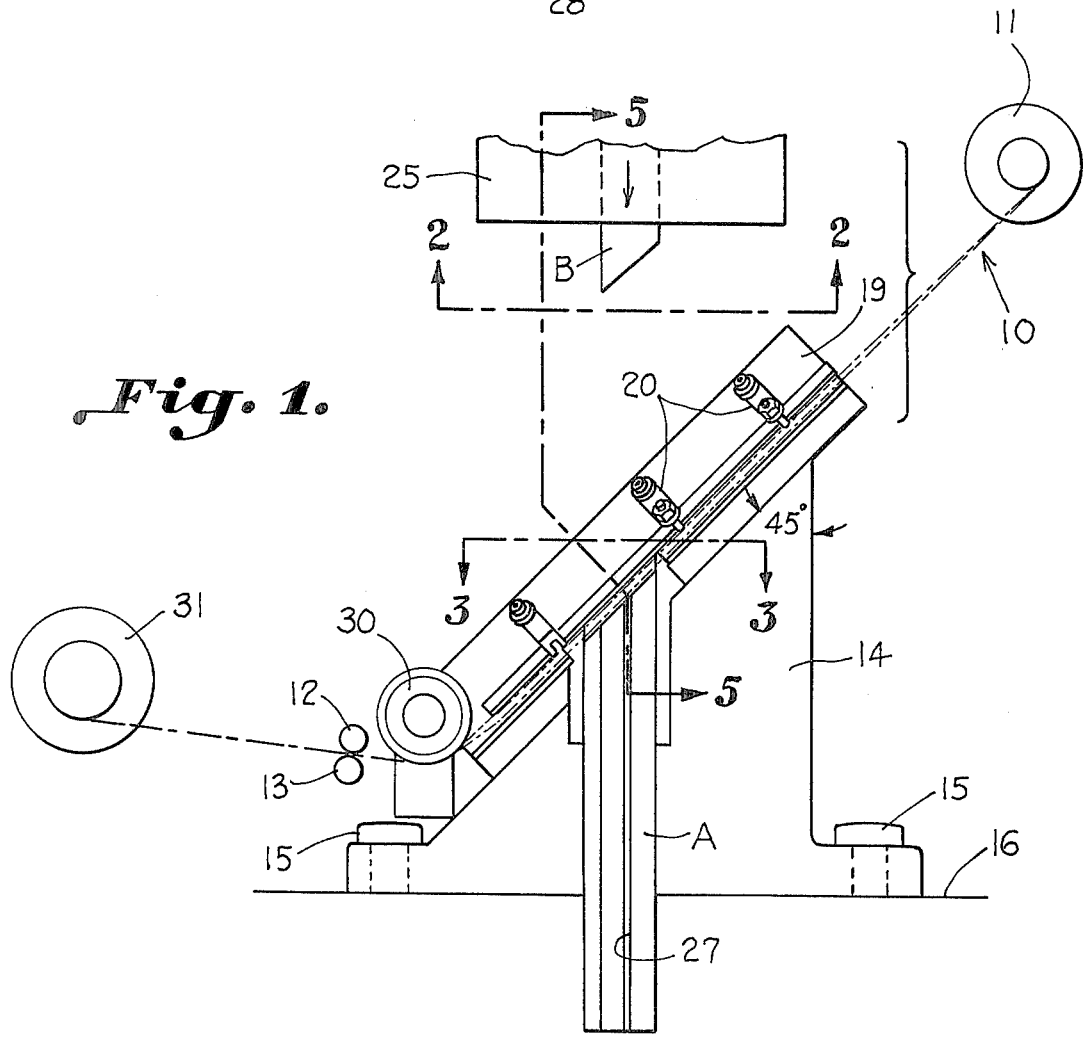
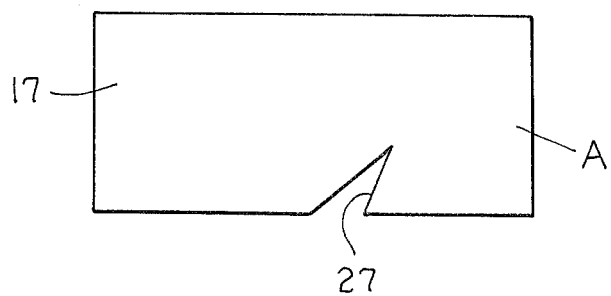

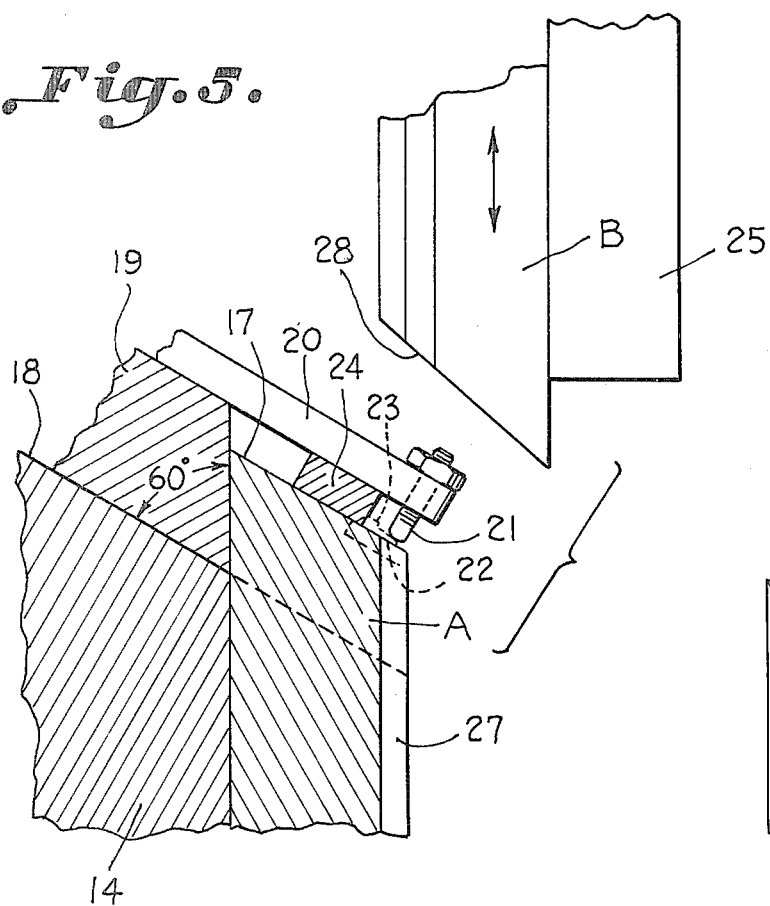
Fig. 5.
Fig. 4.
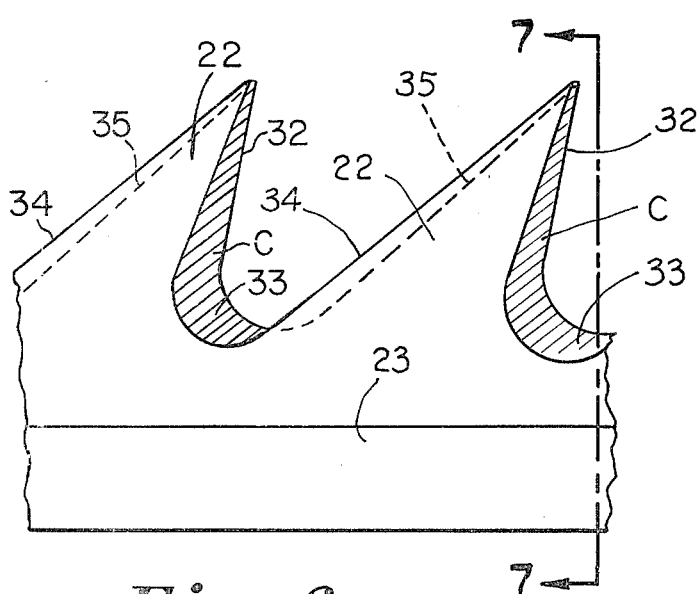
Fig. 6.
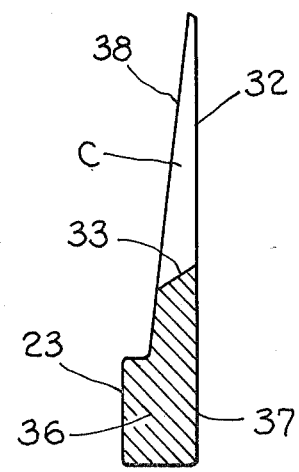
Fig. 7.

METALLIC CARD CLOTHING

BACKGROUND OF THE INVENTION

Efforts have been made in the past to form carding surfaces wherein pyramidal teeth have a sharpened leading edge. Such a structure is contemplated in British Pat. No. 974,186, published Nov. 4, 1964, however, such surface was formed by cutting or grinding a surface with a gang cutting device. Such a configuration would be wholly impractical from the standpoint of manufacture in the volume necessary for use in connection with most carding elements used in practical operation. In Swiss Pat. No. 464,349, published Feb. 28, 1969, teeth of varying depth are alternately laterally deflected. It has heretofore been contemplated that saw blades may be manufactured by punching a metallic strip and such has been illustrated in U.S. Pat. No. 2,510,462. This patent contemplates feeding the blade for regular stopping momentarily for carrying out the punching operation and the applicable disclosure of this patent is incorporated herein and made a part hereof by reference. Saw blades have also been contemplated having teeth with sharpened leading edges such as illustrated in U.S. Pat. No. 3,331,265. This patent contemplates the formation of teeth by a milling operation and results in a simple angle forming the leading edge of the saw teeth.

The metallic wire card clothing used in conventional carding operations and placed upon conventional carding elements such as cylinders, licker-ins, doffers, flats, and the like have teeth which are placed therein by means of a punch and die. The teeth are slightly recessed or beveled toward the die side of the tooth as normally results from the punching operation. Such a punching phenomenon in connection with saw blades is shown in U.S. Pat. No. 3,540,317. The teeth are customarily formed in profile wire having a base and an upwardly tapering rolled portion extending therefrom in which the teeth are formed. In conventional methods of manufacture, the teeth of metallic card clothing are formed by a punch driven at right angles, both longitudinally and transversely, to the direction of travel of the profile wire. The teeth thus have sides as well as a transverse leading edge together with a transverse trailing edge.

It is desirable that the teeth present a thinner forward working surface with thinner points in order to reduce nep count, but if the point is too thin, wear results in excessive regrinding and resetting. There may be a tendency for the tip of the tooth to twist away from the die side. A conventional shouldered configuration may be employed herein but a wide variety of configurations may be employed so long as a base support is provided for the teeth.

It is an important object of the present invention to provide a sharpened surface along the leading edge of the teeth of metallic card clothing.

It has been found that by utilizing such a configuration, the nep count may be reduced and unexpectedly that the required amount of opposed carding surface may be reduced and such lesser amount of surface set at a greater distance from the cylinder thus reducing wear and minimizing the possibility of facing of the clothing of the cylinder and carding surface. The wider settings reduce the tendency for fiber damage. All settings between such clothed surfaces may be increased. Moreover, considerably greater production speeds may be achieved without sacrifice of these advangtages.

A further object of the present invention is to provide a carding surface where the teeth retain their sharpness and carding effectiveness after considerable wear or grinding.

BRIEF DESCRIPTION OF THE INVENTION

It has been found that metallic card clothing may be constructed from a wire strip so as to have longitudinally spaced punched teeth therein with a sharpened leading edge. The apparatus includes a die, operating in cooperation with a punch, the direction of travel of which is inclined either transversely or longitudinally of the direction of feed of the metallic strip at an angle while punching the teeth in an edge of the strip. Preferably, the inclination is in both directions resulting in the formation of a compound angle in the leading edge of the teeth. Preferably, the strip has been previously formed by rolling the edge to taper it inwardly toward the upper edge to result in a thin point.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a schematic side elevation illustrating apparatus and method for making metallic card clothing in accordance with the invention;

FIG. 2 is a bottom plan view taken on the line 2—2 in FIG. 1 illustrating the complementary lower entry end of the punch;

FIG. 3 is a top plan view taken on the line 3—3 in FIG. 1 illustrating the upper entry end of the die;

FIG. 4 is a perspective view further illustrating the upper entrance end of the die;

FIG. 5 is a transverse sectional elevation taken on the line 5—5 in FIG. 1 illustrating a punch and die for placing a sharpened leading edge on the longitudinally aligned teeth of the card clothing in accordance with the invention;

FIG. 6 is a side elevation illustrating a tooth having a sharpened leading edge; and FIG. 7 is a transverse sectional elevation taken on the line 7—7 in FIG. 6.

DESCRIPTION OF A PREFERRED EMBODIMENT

A method of making metallic card clothing includes continuously feeding the strip longitudinally past a die A. By inclining the strip at an angle with respect to the direction of travel of the punch, sharpened teeth may be provided. While the strip is so inclined a punch B is driven into operative engagement with the die removing a chip from the strip defining the forward edge of a tooth, a root cut and a trailing edge of an adjacent tooth. Thus, the forward edge C is inclined at an angle transversely of the tooth forming a sharpened leading edge for improved carding. Preferably, the strip is longitudinally inclined at an acute angle (left to right) and simultaneously at an angle transversely (downwardly).

The metallic wire card clothing includes an elongated metallic wire base portion. A tooth forming portion is integral with and extends vertically from the base. A plurality of spaced teeth punched in the tooth forming portion point upwardly. The teeth have a front face, sides, and a trailing edge defined by the tooth forming portion. The front face being punched at an acute angle across the strip forms a sharpened leading edge C pointing in the operational direction of movement of the clothing during carding and extends substantially along the entire height of the front face. Preferably, the tooth forming portion is rolled or drawn so as to taper inwardly upwardly from a thickened base. Also preferably the pointed or sharpened leading edge is on a die side of the teeth and is at a positive angle. Also, as illustrated, the acute angle is best defined by a compound angle formed by disposing the direction of travel of the punch at an angle both transversely and longitudinally to the direction of travel of the strip.

Apparatus for punching the teeth includes a die A having an upper surface for supporting a side portion of the strip. This surface is inclined in a direction longitudinally of the strip illustrated as at an angle of 30 degrees to the horizontal. The surface is also inclined in a direction transversely of the strip and is illustrated as being at a 45 degree angle. A driven punch B is carried opposite the die, and the guide means position the strip as the strip is fed between the die and the punch. The leading edge of the teeth is thus punched at a compound angle. The transverse inclination tends to put a sharp angle on the die side and is usually the most desirable angle if a choice must be made between the use of a transverse or a longitudinal angle. The longitudinal angle tends to put a sharpened edge on the punch side so to some extent the respective angles may tend to cancel each other out in the compound angle achieved by their joint use. Importantly, however, a sharper or thinner tooth toward the point is achieved by the compound angle and less grinding is required to achieve even teeth.

Referring more particularly to FIG. 1, a continuous metallic strip broadly designated at 10, is continuously or constantly fed from a supply roll 11 for forming clothing as described below. The wire strip 10 is fed continuously, being pulled by feed rolls 12 and 13, so as to be synchronized intermittently in timed relation with the motion of the punch when punching teeth in an edge of the metallic strip. A reciprocating punch is illustrated herein, but if desired, a rotary punch may be utilized, in which case it would probably be unnecessary to impart intermittent motion to the feeding of the strip with the action of the punch.

A support block 14 is suitably secured as by bolts 15 upon a frame surface 16. The block 14 carries a die member A therein so that its upper surface 17 is in alignment with the surface 18 of the block. The surface 18 carries a block 19 which positions spaced holddown members 20. The holddown members 20 have an adjustable threaded member 21 which may be a guide and serve to hold down the tapered edge 22 of the metallic strip. The metallic strip is illustrated as having a thickened base or shoulder which includes a flat forward side portion 23. A suitable guide member 24 may be provided engaging a base of the strip. The punch B is illustrated as being mounted upon a driven carrier 25 which reciprocates upwardly and downwardly in FIG. 1. The punch has a tapering leading surface having an angled portion 26 which is complementary to the surface 27 of the die, as best illustrated in FIGS. 2 and 3. The die is further illustrated in FIG. 5 as having an edge inclined downwardly as at 28, and FIG. 2 shows an end surface 29 angled upwardly from left to right to accommodate the punch within the die illustrated in FIGS. 3 and 4. The wire with the teeth punched therein passes beneath a guide roller 30 and thence through the feed rolls to a takeup storage roller 31.

As best illustrated in FIGS. 6 and 7, the metallic card clothing presents an angled leading edge C preferably at a positive angle as illustrated. The sharpened leading edge is illustrated at 32, extending to the depth of cut and the depth of cut portion of the teeth is inclined as illustrated at 33. The trailing edge is illustrated at 34, and it will be noted that the resulting angle is illustrated by the broken line 35. The tooth is illustrated in FIG. 6 as having a thickened base portion 36 although it need not necessarily be thickened. The illustrated configuration is preferred and forms a shoulder. The tapered portion extends vertically upwardly on one side as illustrated at 38.

Important new and unexpected results are achieved in that not only is the nep count reduced but also less carding area is required and settings are not so critical. There are less broken fibers and easier carding producing improved quality is achieved. Better carding is achieved by presenting a sharp edge to the fibers. Furthermore, it has been found that fibers are more easily stripped from carding elements clothed with metallic clothing constructed in accordance with the invention. The distribution of the teeth is more uniform requiring less grinding. Production may be increased with improved quality.

While a preferred embodiment of the invention has been described using specific terms, such description is for illustrative purposes only, and it is to be understood that changes and variations may be made without departing from the spirit or scope of the following claims.

What is claimed is:
1. Metallic wire card clothing comprising:
    an elongated metallic wire strip having a base portion;
    a tooth forming portion integral with and extending upwardly from the base;
    a plurality of spaced teeth punched in said tooth forming portion;
    said teeth having a front face, sides defined by said tooth forming portion and a trailing edge;
    said front face being punched forming an acute angle across the strip presenting a sharpened leading edge pointing in the direction of movement of the clothing; and
    said sharpened leading edge extending substantially along the length of said front face.
2. The structure set forth in claim 1 wherein said tooth forming portion is tapered extending vertically upwardly from a thickened base forming a shoulder.
3. The structure set forth in claim 1 or claim 2 wherein said leading edge is on a die side of said teeth, and said sharpened leading edge is at a positive angle.
4. The structure set forth in claim 1 wherein said acute angle is defined by a compound angle punched by disposing a punch at an acute angle both transversely and longitudinally of the direction of travel of said strip.

* * * * *